(12) United States Patent  (10) Patent No.: US 7,525,535 B2
Kim et al.  (45) Date of Patent: Apr. 28, 2009

(54) PORTABLE TERMINAL

(75) Inventors: Jong-Hun Kim, Seoul (KR); Min-ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/828,978

(22) Filed: Jul. 26, 2007

(65) Prior Publication Data

US 2008/0024462 A1  Jan. 31, 2008

(30) Foreign Application Priority Data

Jul. 27, 2006  (KR) .................. 10-2006-0071043

(51) Int. Cl.
*G06F 3/041* (2006.01)

(52) U.S. Cl. ...................... 345/169; 345/173

(58) Field of Classification Search ......... 345/156–184, 345/901, 905; 178/18.01–18.11, 19.01–19.07
See application file for complete search history.

(56) References Cited

U.S. PATENT DOCUMENTS

| 6,888,591 | B2 * | 5/2005 | Kim ............................ 349/58 |
| 2001/0012769 | A1 * | 8/2001 | Sirola et al. ................... 455/90 |
| 2003/0040287 | A1 | 2/2003 | Lee |
| 2005/0280635 | A1 | 12/2005 | Hinata |
| 2006/0097991 | A1 * | 5/2006 | Hotelling et al. ............ 345/173 |
| 2007/0000764 | A1 * | 1/2007 | Bellows et al. .............. 200/310 |

FOREIGN PATENT DOCUMENTS

DE  20 2005 010500 U1  10/2005
EP  1 758 345 A1  2/2007

* cited by examiner

*Primary Examiner*—David L Lewis
(74) *Attorney, Agent, or Firm*—Birch, Stewart, Kolasch & Birch, LLP

(57) ABSTRACT

A portable terminal has a body including a transparent window integrally formed therein, a display disposed beneath the body and visible through the transparent window, and a touch screen located between the display and the body, the touch screen permitting signal input in a capacitive manner.

5 Claims, 5 Drawing Sheets

PORTABLE TERMINAL

CROSS REFERENCE TO RELATED APPLICATION

The application claims the benefit of priority to Korean Application No. 10-2006-0071043, filed on Jul. 27, 2006, which is herein expressly incorporated by reference in its entirety.

BACKGROUND OF THE INVENTION

1. Field of the Invention

The present invention relates to a portable terminal, and more particularly, to a portable terminal that applies a capacitive touch pad to a display.

2. Description of Related Art

FIG. 1 is an exploded perspective view of a portable terminal according to the related art, and FIG. 2 is a sectional view of a portable terminal according to the related art.

The related art portable terminal includes a body 110, a display 114 disposed to be exposed to the outside of the body 110 to display information, and a touch pad 112 attached onto a surface of the display 114 to input signals.

The touch pad 112 is outwardly exposed because information can be inputted only by applying pressure directly onto the surface of the touch pad 112. Therefore, the body 110 has an opening 116 so as to dispose the touch pad 112 to be outwardly exposed. In addition, the touch pad 112 is formed to be transparent, so as to enable viewing of information displayed on the display 114 from the outside.

An adhesive tape (not shown) is attached onto an edge of an upper surface of the touch pad 112, and accordingly the tape-attached edge of the touch pad 112 is adhered onto an edge of an inner surface of the opening 116. Also, the adhesive tape is attached onto an edge of a lower surface of the touch pad 112 so as to adhere the edge of the lower surface of the touch pad 112 onto an edge of an upper surface of the display 114.

In the related art portable terminal having the configuration as explained above, upon directly touching the surface of the touch pad 112, pressure change occurs at the touched portion of the touch pad 112, thereby inputting a signal.

However, since the touch pad 112 of the related art portable terminal is exposed to the outside of the body 110, the opening 116 extends through the body 110, which results in an unattractive appearance of the terminal, and allows permeation of foreign materials (e.g., dust or water) into the body 110 through the opening 116.

BRIEF SUMMARY OF THE INVENTION

Therefore, in order to solve those problems, an object of the present invention is to provide a portable terminal in which a capacitive touch pad is disposed on a display and a transparent window is integrally formed at a body, such that an attractive design of the terminal can be obtained and foreign materials can be prevented from being permeated into the terminal.

To achieve this and other advantages and in accordance with the purpose of the present invention, as embodied and broadly described herein, there is provided a portable terminal having a body including a transparent window integrally formed therein, a display disposed beneath the body and visible through the transparent window, and a touch screen located between the display and the body, the touch screen permitting signal input in a capacitive manner.

In another aspect, the body may have a surface thereof coated with an opaque film to be integrally formed with the transparent window.

In yet another aspect, the body may be formed by a double injection molding.

In still another aspect, the touch pad may include a touch-sensing unit disposed at an inner surface of the transparent window and touchable by a user's body via the transparent window, and a signal transferring unit disposed at an edge of the touch-sensing unit to transfer a coordinate value read by the touch-sensing unit. In addition, the signal-transferring unit installed at the edge of the touch pad may be transparent.

In a further aspect, a gap-maintaining pad may be interposed between the touch pad and the display to maintain a gap between the touch pad and the display.

In yet another aspect, the touch pad may have one end electrically connected to the display and a main circuitry supporting substrate via a flexible circuitry supporting substrate. In addition, the flexible circuitry supporting substrate may have a control circuit that converts a signal generated from the touch pad into a coordinate value and transfers the coordinate value to a controller of the main circuitry supporting substrate.

In still another aspect, the body has a surface thereof coated with an opaque film to be integrally formed with the transparent window, and the opaque film may cover the signal-transferring unit.

In yet another aspect, the body has a substantially planar front surface, and the transparent window forms a portion of the front surface.

In another aspect, the body has an uninterrupted front surface, and the transparent window forms a portion of the front surface.

According to principles of the present invention, a mobile communication device for receiving and transmitting wireless communication signals is provided that includes a body having a transparent window integrally formed therein, a display disposed beneath the body and visible through the transparent window, and a touch screen located between the display and the body, the touch screen permitting signal input in a capacitive manner to control the mobile communication device.

Further aspects of the mobile communication device are similar to those detailed above.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the exemplary embodiments of the present invention, with reference to the accompanying drawings. Wherever possible, the same reference number has been used for the same part in all of the exemplary embodiments.

Figure 1:
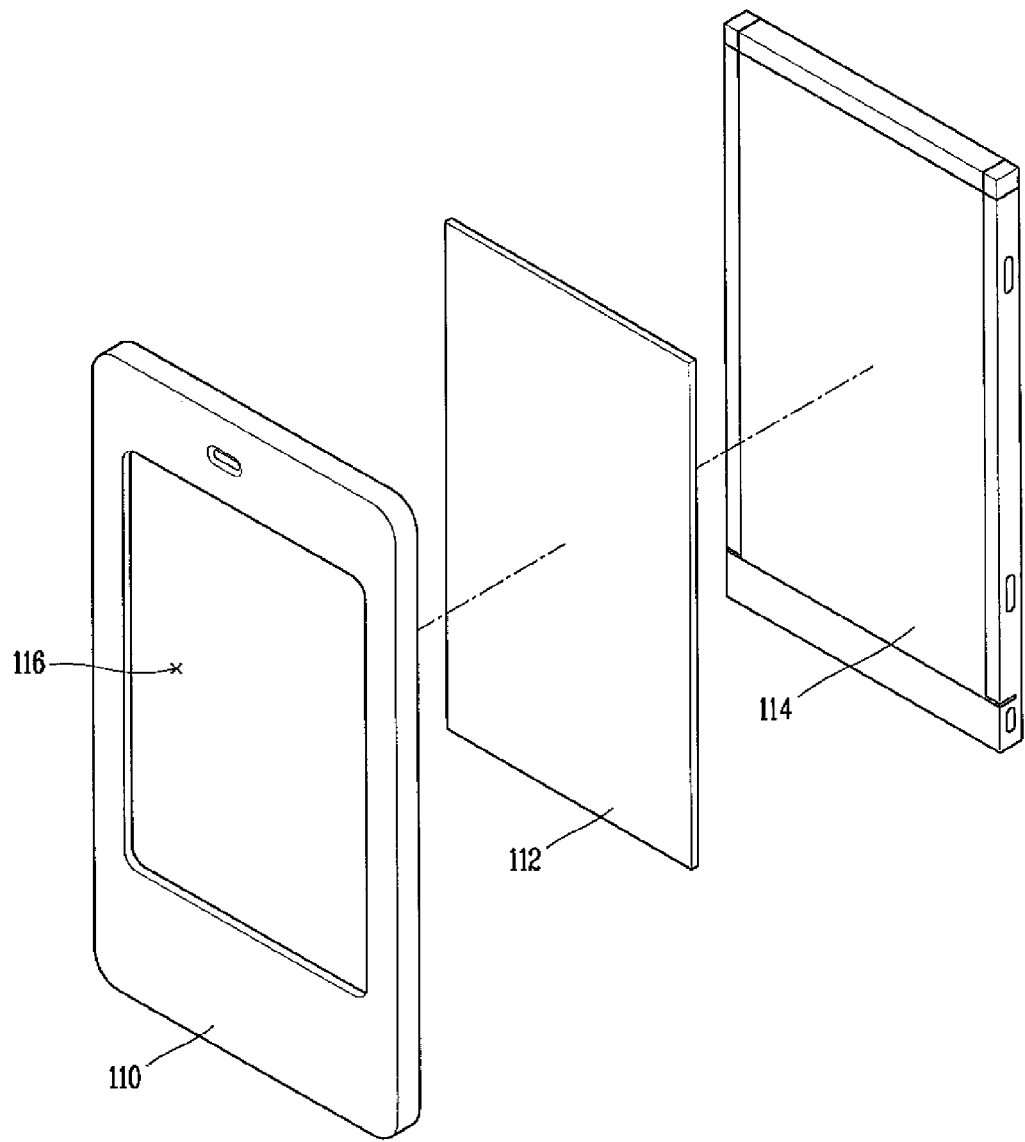
FIG. 1 is a perspective view of a portable terminal according to the related art.
Figure 2:
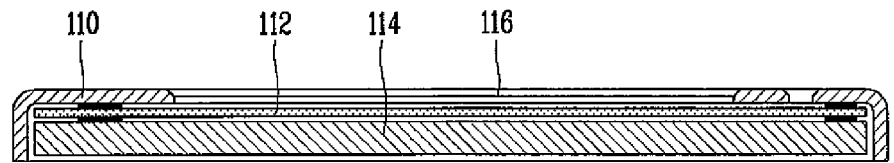
FIG. 2 is a sectional view of a portable terminal according to the related art.
Figure 3:
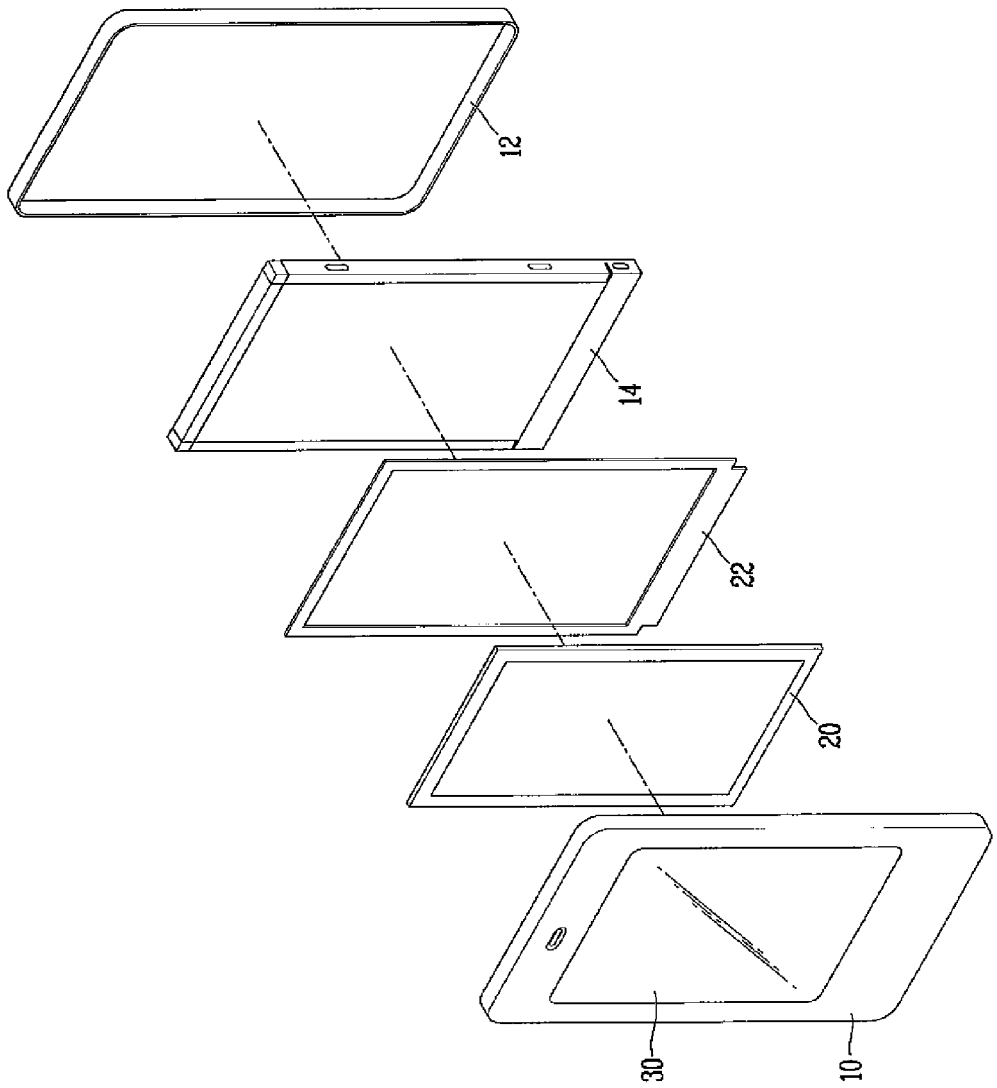
FIG. 3 is an exploded perspective view of a portable terminal in accordance with a first exemplary embodiment of the present invention.
Figure 4:
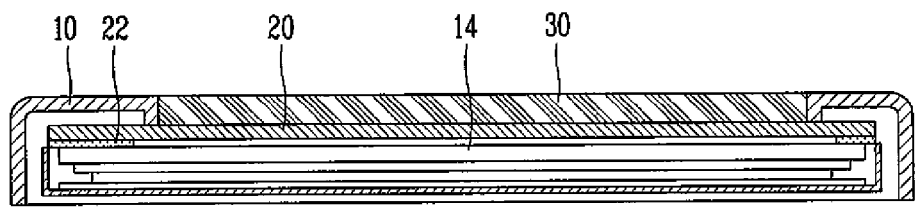
FIG. 4 is a partial sectional view of a portable terminal in accordance with the first exemplary embodiment of the present invention.

As seen in FIGS. 3 and 4, a portable terminal, such as, but not limited to a mobile communication device, in accordance with the first exemplary embodiment of the present invention includes bodies 10 and 12, a display 14 which is disposed in the bodies 10 and 12 to display information, and a transparent touch pad 20 which is disposed at an upper surface of the display 14 to input information in a capacitive manner.

Inside the bodies 10 and 12, a main circuitry supporting substrate (not shown) electrically connected to both the display 14 and the touch pad 20, and a battery for supplying power source may further be disposed.

When the portable terminal is used in a communication mode, both a speaker for outputting sound and a microphone for inputting sound may be installed inside the bodies 10 and 12.

The bodies 10 and 12 are divided into the upper body 10 (relatively disposed at an upper portion) and the lower body 12 coupled to the upper body 10. A transparent window 30 is formed at the upper body 10 to allow viewing of information displayed on the display 14 from the exterior.

Figure 7:
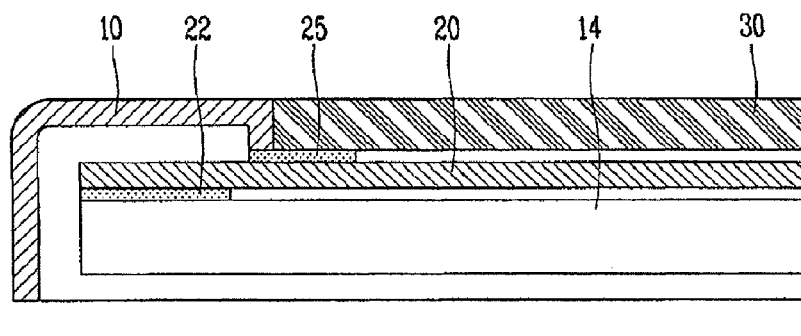
FIG. 7 is a partial sectional view of a portable terminal in accordance with a second exemplary embodiment of the present invention.

The transparent window 30 is integrally formed at the upper body 10 when forming the upper body 10. That is, the upper body 10 is formed by a double injection molding. The upper body 10 may be formed of a transparent material. Alternatively, the body 10 may be a non-transparent material while the transparent window is formed of a transparent material. Regardless of the transparent properties of the upper body 10, the inner surface of the upper body 10 may be coated with an opaque film 25 having a cut-out portion in the shape of the transparent window 30 by an in-mold injection so as to form the transparent window 30 at the upper body 10, as seen in FIG. 7. The opaque film 25 may be used to block the view of the inner structure of the portable terminal as well as overly the non-sensing portion of touch pad 20, which will be described further below.

Since the upper body 10 is integrally formed with the transparent window 30, its surface can be formed to be planar, resulting in obtaining an attractive design and preventing permeation of foreign materials into the bodies 10 and 12.

When being touched by a user's body (e.g., a finger) via the transparent window 30, a capacitive method is used such that the touch pad 20 can sense a change in a constant voltage at the touched portion of the touch pad 20 to thusly allow a signal input.

Figure 5:
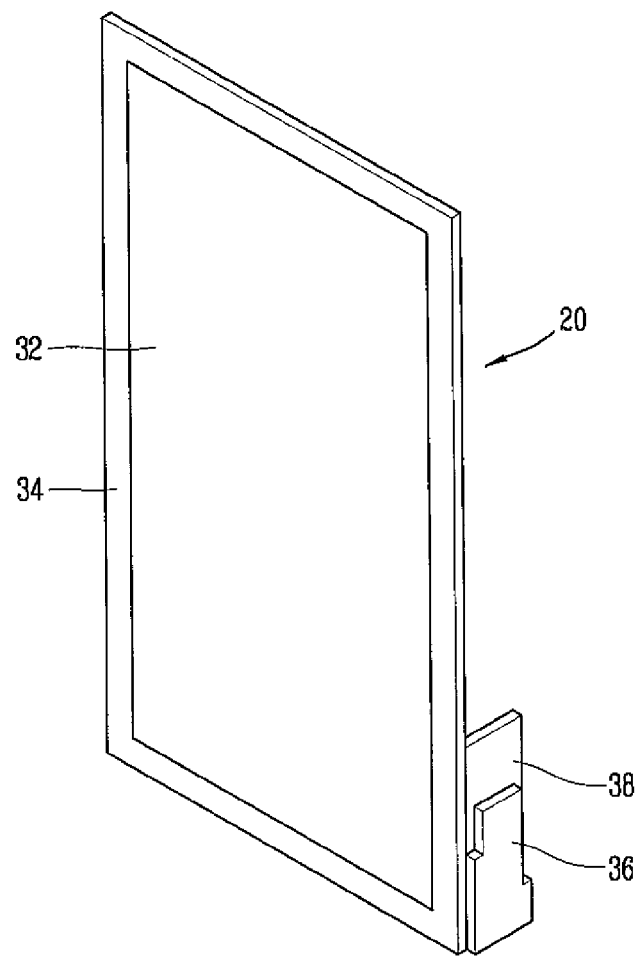
FIG. 5 is a perspective view of a touch pad in accordance with the first exemplary embodiment of the present invention.

The touch pad 20, as shown in FIG. 5, includes a touch-sensing unit 32 touched by a user via the transparent window, and a signal transferring unit 34 installed at the edge of the touch-sensing unit 32 to transfer a signal corresponding to a coordinate value of the touched portion of the touch-sensing unit 32. Because the signal-transferring unit 34 transmits signals, it is considered to be a non-sensing portion of the touch pad 20.

The signal-transferring unit 34 extends from the edge of the touch-sensing unit 32 by a certain width. The signal-transferring unit 34 is formed to be transparent so as not to be recognized through the transparent window 30. That is, the transparently formed signal-transferring unit 34 does not block (veil) information displayed on the display 14 so as to obtain a wider transparent window 30 and reduce the size of the terminal.

The signal-transferring unit 34 is connected to the display 14 and a main circuitry supporting substrate (not shown) via a flexible circuitry supporting substrate 38 to transfer a signal. The flexible circuitry supporting substrate 38 has a control circuit 36 that converts a data signal generated from the touch pad 20 into a coordinate value and transfers the coordinate value to the main circuitry supporting substrate.

The touch pad 20 is attached onto a lower surface of the upper body 10, namely, a lower surface of the transparent window 30 in a bonding (adhesion) manner. Here, the signal-transferring unit 34 and the touch-sensing unit 32 are transparently formed, and accordingly the information on the display 14 can be viewed through the transparent window 30.

The touch pad 20 is disposed to be spaced apart from the display 14 by a certain gap or interval. That is, a gap-maintaining pad 22 having a particular thickness is interposed between the edge of the touch pad 20 and the edge of the display 14 to provide the gap or interval. For example, the gap-maintaining pad 22 may be a double side (adhesive) tape.

The flexible circuitry supporting substrate 38 connected to the signal transferring unit 34 of the touch pad 20 is then connected to both the display 14 and the main circuitry supporting substrate to apply a signal thereto.

Figure 6:
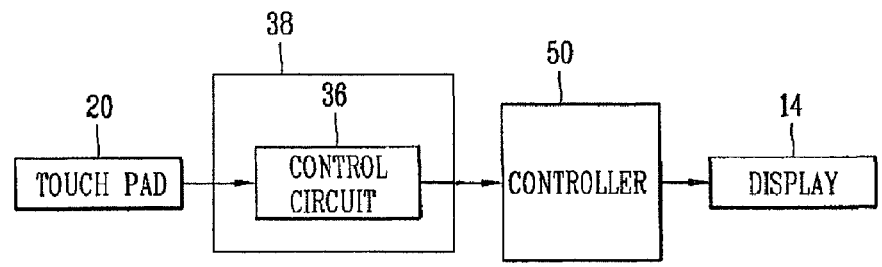
FIG. 6 is a block view of a portable terminal in accordance with the first exemplary embodiment of the present invention.

Operations of the portable terminal according to the present invention having the configuration as described above will be explained with reference to FIG. 6.

First, when turning on the power of the portable terminal, the display 14 is illuminated. Accordingly, information displayed on the display 14 can be viewed from the outside through the transparent window 30 on the upper body 10.

Under this state, one of several keys displayed on the surface of the transparent window 30 is touched by a part of a human body (e.g., a user's finger) so as to input a signal. A constant voltage at the touched key of the touch pad 20 is changed, and thereby a data signal corresponding to the coordinate value of the touched key is transferred to the signal-transferring unit 34. Because the signal-transferring unit 34 is formed to be transparent, information displayed on the display 14 cannot be blocked (veiled).

The signal transferred to the signal-transferring unit 34 is applied to the control circuit 36. The control circuit 36 converts the data signal into the coordinate value and applies the coordinate value to a controller 50 of the main circuitry supporting substrate via the flexible circuitry supporting substrate 38. The controller 50 controls the portable terminal according to the applied coordinate value and also displays necessary information on the display 14.

Having described a portable terminal where the upper body 10 forms a substantial border of the transparent window 30 as seen in FIGS. 4 and 7, it is understood that other configurations of the upper body 10 and transparent window may be provided.

Figure 8:
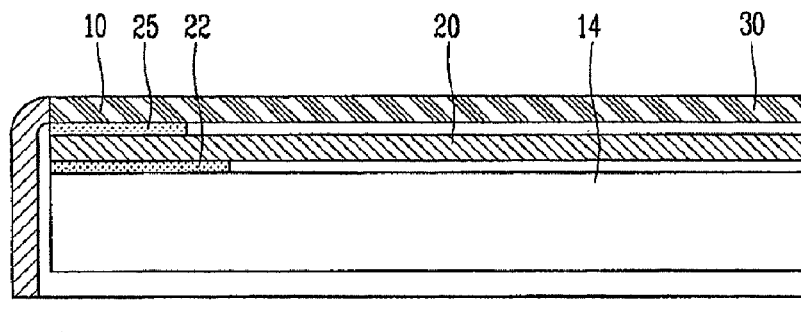
FIG. 8 is a partial sectional view of a portable terminal in accordance with a third exemplary embodiment of the present invention.
Figure 9:
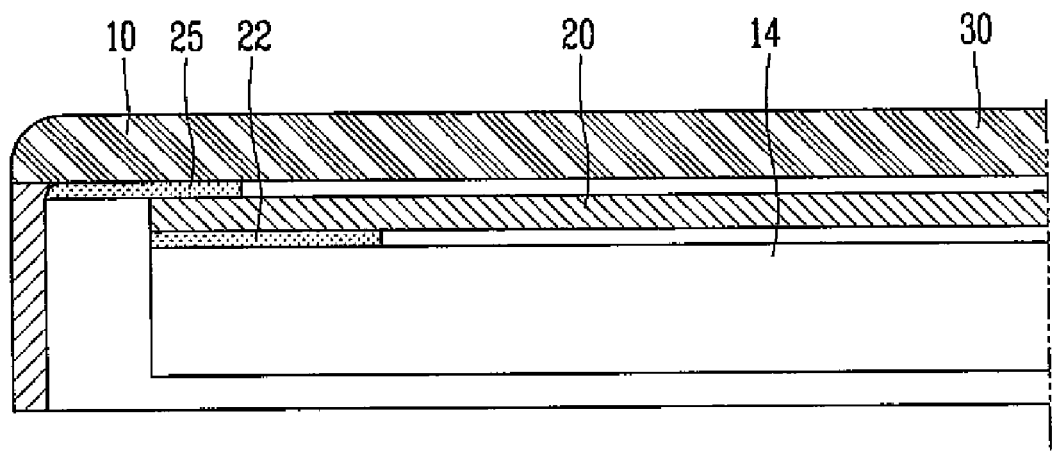
FIG. 9 is a partial sectional view of a portable terminal in accordance with a fourth exemplary embodiment of the present invention.

FIG. 8 shows an exemplary embodiment of a portable terminal similar to the portable terminal of FIG. 7 except that the transparent window 30 forms substantially the entire upper surface of the upper body 10 with a small border at the perimeter of the transparent window 30. In this manner more of the upper surface of the portable terminal may be visible as a display. FIG. 9 shows an exemplary embodiment where the transparent window 30 forms the entire upper surface of the upper body 10 of the portable terminal.

Figure 10:
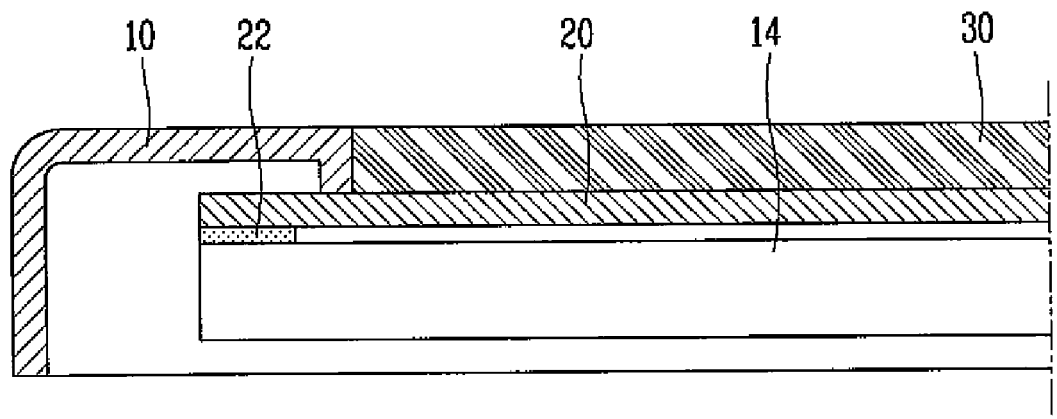
FIG. 10 is a partial sectional view of a portable terminal in accordance with a fourth exemplary embodiment of the present invention.

FIG. 10 shows an exemplary embodiment of a portable terminal similar to FIG. 7, where the opaque film 25 has been eliminated. In this exemplary embodiment, the gap-maintaining pad 22 has been increased in thickness (e.g., smaller opening) so as to at least partially cover the non-sensing portion of the touch pad 20.

As described above, the portable terminal according to the present invention installs a touch pad adapting a capacitive method to input information at an upper surface of a display, and forms a transparent window integrally at a body, whereby various designs can be applied to the body and an attractive appearance of the terminal can be obtained. In addition, because an opening at the body is not required, foreign materials such as dust or water can be prevented from being permeated into the body.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A portable terminal, comprising:
 a housing having a transparent window integrally formed therein, the housing including an opaque film located on a lower surface thereof, the opaque film having an open portion to define the transparent window;
 a display disposed at the housing, the display displaying information through the transparent window; and
 a touch pad disposed between the housing and the display, the touch pad permitting signal input in a capacitive manner, the touch pad having one end electrically connected to at least one of the display and a main circuitry supporting substrate via a flexible printed circuit (FPC), wherein:
 the touch pad includes:
  a touch sensing-unit disposed at an inner surface of the transparent window and touchable by a user's body via the transparent window; and
  a signal-transferring unit disposed at an edge of the touch-sensing unit to transfer a signal corresponding to a coordinate value read by the touch-sensing unit; and
 the FPC includes a control circuit mounted thereon, the control circuit being configured to convert the signal generated by the signal transferring unit into the coordinate value and to transfer the coordinate value to a controller of the main circuitry supporting substrate.

2. The portable terminal of claim 1, wherein the housing is formed by a double injection molding.

3. The portable terminal of claim 1, wherein the signal-transferring unit disposed at the edge of the touch pad is transparent.

4. The portable terminal of claim 1, wherein a gap maintaining pad is interposed between an edge of the touch pad and an edge of the display to maintain a gap between the touch pad and the display.

5. A portable terminal, comprising:
 a housing having a transparent window integrally formed therein, the housing including an opaque film located on a lower surface thereof, the opaque film having an open portion to define the transparent window;
 a display disposed at the housing, the display displaying information through the transparent window; and
 a touch pad disposed between the housing and the display, the touch pad permitting signal input in a capacitive manner, the touch pad having one end electrically connected to at least one of the display and a main circuitry supporting substrate via a flexible printed circuit (FPC), wherein the FPC includes a control circuit mounted thereon, the control circuit being configured to convert a signal generated by the touch pad into a coordinate value and to transfer the coordinate value to a controller of the main circuitry supporting substrate.

* * * * *